United States Patent
Chen

(10) Patent No.: US 9,597,831 B2
(45) Date of Patent: Mar. 21, 2017

(54) BLOW MOLDING TOOLING FOR HIGH CAVITATION APPLICATIONS

(71) Applicant: R&D Tool & Engineering Co., Lees Summit, MO (US)

(72) Inventor: Jincheng Chen, Leawood, KS (US)

(73) Assignee: R&D Tool & Engineering Co., Lees Summit, MO (US)

( * ) Notice: Subject to any disclaimer, the term of this patent is extended or adjusted under 35 U.S.C. 154(b) by 286 days.

(21) Appl. No.: 14/317,746

(22) Filed: Jun. 27, 2014

(65) Prior Publication Data
US 2015/0375439 A1 Dec. 31, 2015

(51) Int. Cl.
*B29C 49/06* (2006.01)
*B29L 22/00* (2006.01)

(52) U.S. Cl.
CPC ........ *B29C 49/06* (2013.01); *B29C 2049/066* (2013.01); *B29L 2022/00* (2013.01)

(58) Field of Classification Search
CPC ............ B29C 45/2725; B29C 45/1744; B29C 45/1765; B29C 45/1761; B29C 2045/2791; B29C 2045/2729; B29C 2045/1762; B29C 2045/1765; B29C 2045/1767; B29C 2045/1761; B29C 2045/2722
See application file for complete search history.

(56) References Cited

U.S. PATENT DOCUMENTS

| | | | |
|---|---|---|---|
| 3,559,245 A * | 2/1971 | Ryan .................... | B29C 45/20 425/549 |
| 6,726,467 B1 * | 4/2004 | Lefebure ............. | B29C 45/2725 264/328.15 |
| 7,704,069 B2 | 4/2010 | Chen et al. | |
| 7,771,189 B2 * | 8/2010 | Chen .................... | B29C 45/2701 425/549 |
| 8,475,157 B2 * | 7/2013 | Chen .................... | B29C 45/27 425/570 |
| 8,523,556 B2 * | 9/2013 | Fields .................. | B29C 49/063 249/79 |
| 8,562,334 B2 * | 10/2013 | Fields .................. | B29C 49/063 249/79 |
| 2007/0141195 A1 * | 6/2007 | Chen .................... | B29C 45/27 425/568 |
| 2013/0202728 A1 * | 8/2013 | Maenner ............... | B29C 45/76 425/169 |
| 2013/0280366 A1 | 10/2013 | Chen | |
| 2014/0042673 A1 * | 2/2014 | Fields .................. | B29C 49/061 264/537 |

* cited by examiner

Primary Examiner — Jason L Lazorcik
(74) Attorney, Agent, or Firm — Hovey Williams LLP

(57) ABSTRACT

An injection station of an injection blow molding machine and a method for forming parisons and molded articles. The injection station includes a die plate with a keyway formed through a least a portion of a surface of the die plate. The keyway separates front and back portions of the surface of the die plate. The injection station further includes a resin injection tooling comprising a draw bar, with at least a portion of the draw bar operable to be positioned within the keyway of the die plate, a base plate secured to a back side of the draw bar and operable to be secured to the back portion of the surface of the die plate and, and a manifold secured to a top of the base plate, with the manifold being configured to discharge resin into cavities to form the parisons.

18 Claims, 10 Drawing Sheets

BLOW MOLDING TOOLING FOR HIGH CAVITATION APPLICATIONS

BACKGROUND OF THE INVENTION

1. Field of the Invention

Embodiments of the present invention relate to an injection apparatus, system, and method. In particular, embodiments of the present invention relate to an injection station and an injection tooling of an injection blow molding machine for use in high cavitation applications.

2. Description of the Related Art

Injection blow molding is a technique used for creating various containers such as plastic bottles. The injection blow molding process is performed with an injection blow molding machine that first injection molds a resin into a plurality of parisons of desired shapes and then blow molds the parisons into the final molded articles.

An injection station of the injection blow molding machine typically includes a split parison mold assembly that defines a plurality of cavities within which parisons are formed. Hot melt resin injection nozzles have nozzle gate inserts that are seated in gate openings of the cavities for injecting resin into the cavities so as to form the parisons. To remove a set of newly formed parisons from the mold, an upper mold half is raised off a bottom mold half, and cores that carry the new parisons are then lifted and rotated out of the mold. A new set of cores is placed in the cavities of the bottom mold half and the mold is closed, creating a diametrical sealing relationship between each tip of the nozzle gate insert and the wall of its gate opening and preparing the mold cavities to receive hot melt resin through the nozzles.

Each nozzle is coupled, at its base, with a resin manifold that is secured to a die plate via a base plate. Prior to performing the injection blow molding, the manifold is heated to a desired operating temperature. Hot melt resin is supplied to each nozzle at the nozzle's base from a resin source associated with the manifold. The resin then flows through the nozzles and to the parison mold. In certain tooling applications, such as tooling described in U.S. Pat. No. 7,771,189 (the '189 patent) filed on Mar. 3, 2008, and entitled "INJECTION MOLDING APPARATUS WITH REPLACEABLE GATE INSERT," which is incorporated by reference herein in its entirety, a gap of between 0.000 and 0.010 inches (hereinafter, a "gap" or a "zero gap") may exist between the inside of the nozzle gate insert and the front end of the nozzle to allow independent movement of the cavities and the manifold. Such movement may arise due to the difference in thermal expansion of the cavities and the manifold since the cavities and the manifold may be operated at different temperatures. As such, hot melt resin will fill the gap and be cooled down enough to form a seal during injection of the hot melt resin into the cavity. However, the holt melt resin that collects within the gap can cause significant hydraulic backpressure against the nozzle and the resin manifold. Especially in injection tooling applications that use a plurality of nozzles to form a plurality of parisons, such hydraulic backpressures may exert forces in excess of thirty tons on the resin manifold and/or on the base plate. Such a force can cause the resin manifold and/or the base plate to move backward, to bend upward, and/or to bow, thus causing the gap to increase and eventually causing resin to leak from the interface of the nozzle gate insert and the front end of the nozzle.

As mentioned, before the nozzles can inject the hot melt resin into the cavities, the hot melt resin is required to be heated to a beginning operating temperature (e.g., between 350 to 560° F.). Additionally, the resin must maintain at least an injection operating temperature while being transferred through and injected from the manifold. Such an injection operating temperature is maintained using heat supplied to the injection tooling components by external sources. However, any heat applied to the resin manifold and/or the base plate tends to cause the manifold and/or base plate to deform, such as by bending or bowing. Such deformations make it difficult to maintain the zero gaps, especially in a high cavitation mold.

Thus, it would be desirable to have an injection station of an injection blow molding machine that is configured to maintain a resin manifold securely in place during operation, even with the presence of hydraulic forces between every nozzle gate insert and corresponding front end of the nozzle.

SUMMARY OF THE INVENTION

Some embodiments of the invention disclose an injection station of an injection blow molding machine, with the injection station comprising a die plate with a keyway formed through a least a portion of a surface of the die plate, and with the keyway separating front and back portions of the surface of the die plate. The station further includes a draw bar, with at least a portion of the draw bar being positioned within the keyway of the die plate, a base plate secured to the back portion of the surface of the die plate and to a back side of the draw bar, and a manifold secured to a top of the base plate, with the manifold being configured to discharge resin into cavities to form the parisons.

Other embodiments of the invention disclose an injection tooling for attachment to a die plate of an injection station, with the tooling comprising: a base plate configured to be secured to a top surface of the die plate, with the base plate including a main section and a plurality of projections extending rearward from the main section, and a manifold secured to a top of the base plate, with the manifold being configured to discharge resin into the cavities to form the parisons.

Some embodiments of the invention disclose a method of operating an injection station of an injection blow molding machine. The method includes the initial step of securing an elongated draw bar within a keyway formed through a top surface of a die plate, with the draw bar including at least one tab extending from a back side of the draw bar. A next step includes engaging a base plate with the draw bar, with the base plate including at least one notch such that during the engaging step, the tab of the draw bar is engaged with the notch of the base plate. Next, the base plate is secured to the draw bar, a rear portion of the base plate is secured to the die plate, and a manifold is secured to a top portion of the base plate.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE FIGURES

Embodiments of the present invention are described in detail below with reference to the attached drawing figures, wherein.

Figure 1:
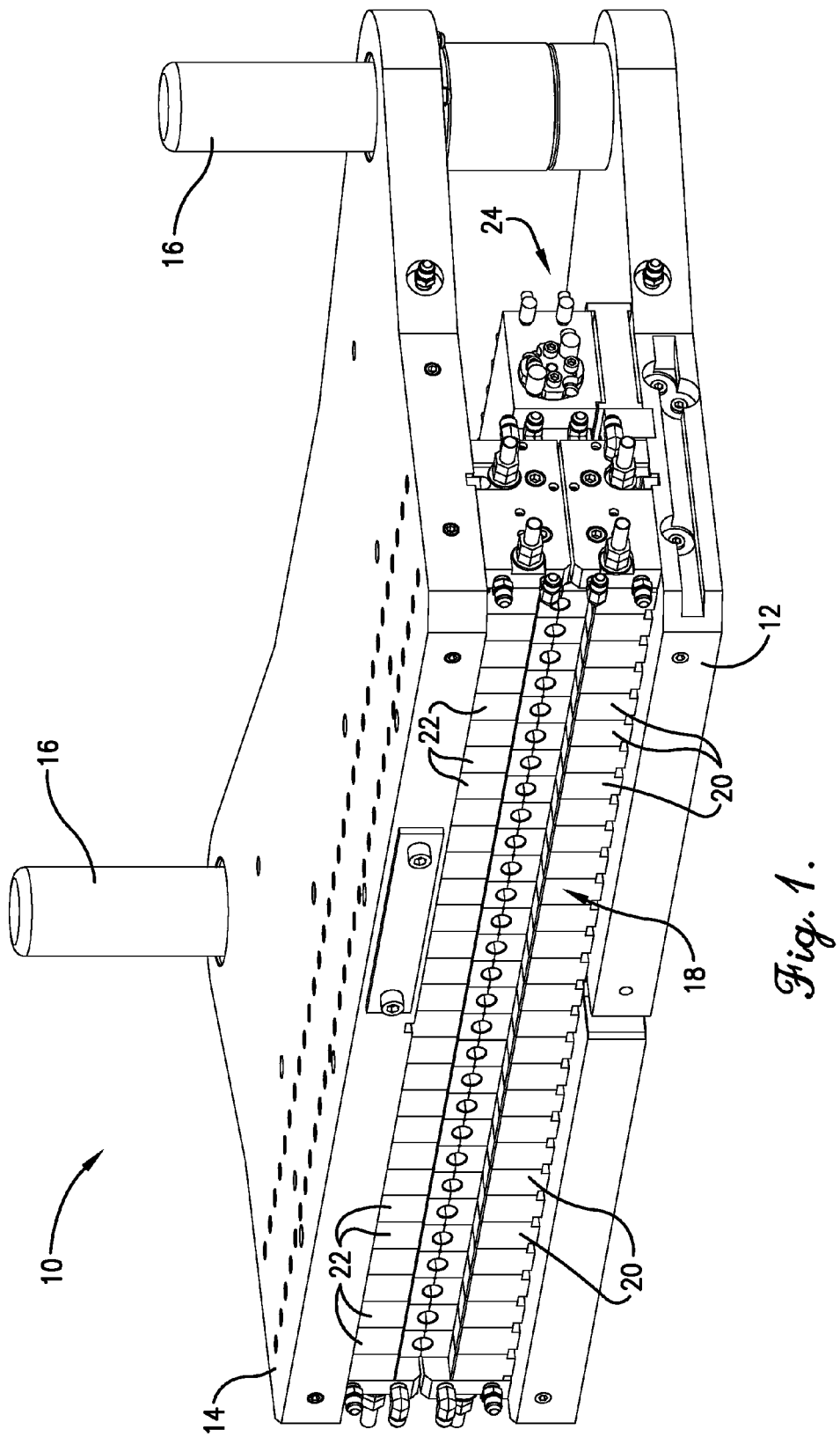
FIG. 1 is a front left perspective view of an injection station of a blow molding machine according to embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
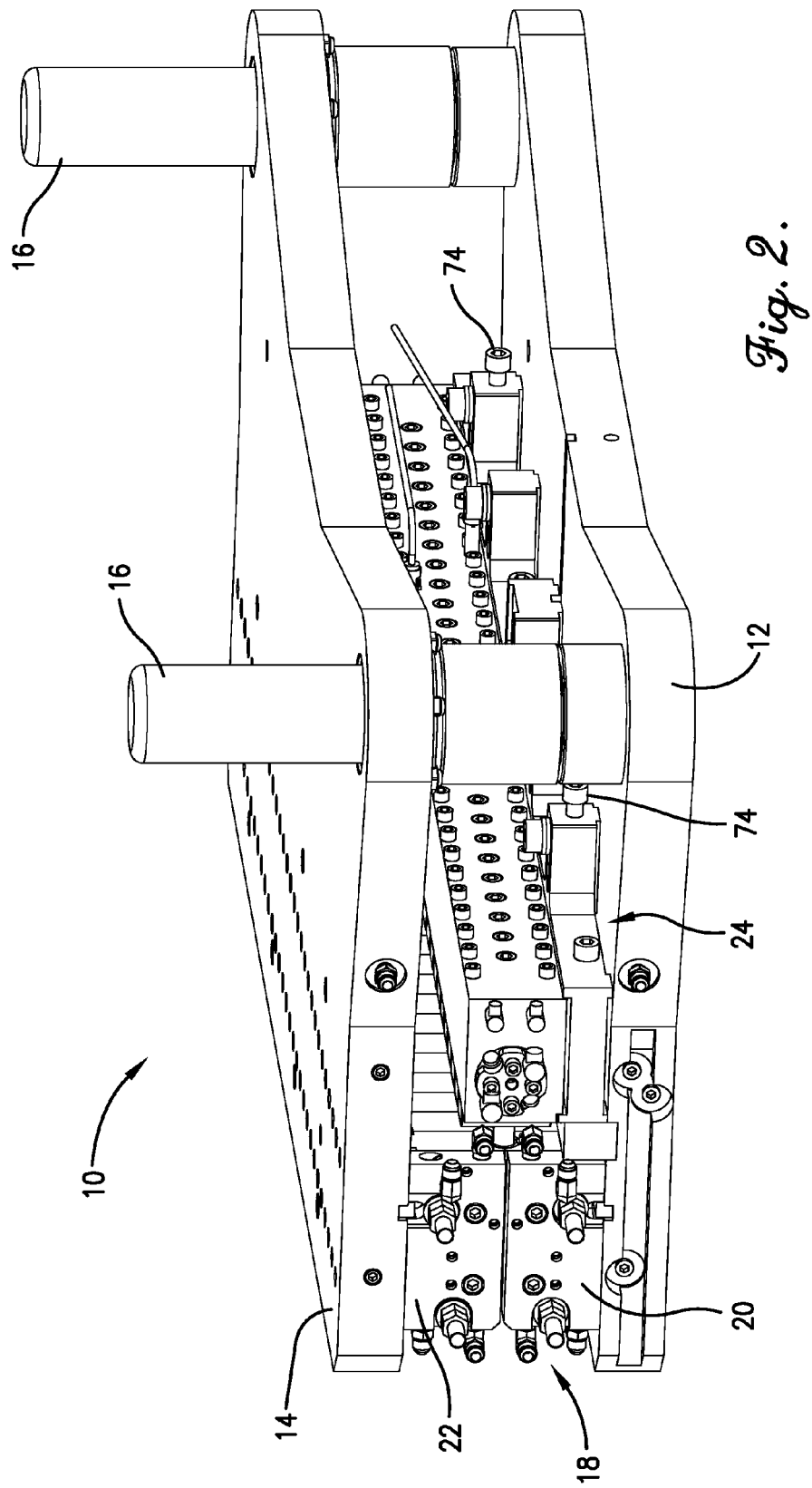
FIG. 2 is a back left perspective view of the injection station from FIG. 1.

Embodiments of the present invention broadly include an injection station 10, as illustrated in FIGS. 1-2, which is configured for use in an injection blow molding machine for injection molding a resin into a plurality of parisons. Upon injection molding the resin, the resulting parisons may be blow molded, via a separate station of the machine, into a plurality of molded articles. As illustrated in FIGS. 1-2, the injection station 10 may include a lower die plate 12 secured to a machine (not shown), an upper die plate 14 overlying lower die plate 12 and that is moveable (by means not illustrated) vertically toward and way from the lower die plate member 12 on upright guides 16, a series of parison molds 18, each including a lower mold half 20 secured to the lower die plate 12 and an upper mold half 22 secured to the upper die plate 14, and a resin injection tooling 24 positioned between the lower and upper die plates 12, 14 generally rearward of the parison molds 18. With the lower and upper die plates 12, 14 in a closed position (e.g., FIGS. 1-2), the parison molds 18 are likewise closed, such that the lower and upper mold halves 20, 22 cooperatively form a parison cavity 25 (see, e.g., FIGS. 3-4) within which resin may be injected to form parisons. As used herein, the terms "forward" or "front" refers to a direction toward the parison molds 18, while the terms "rearward" or "back" refers to a direction towards the upright guides 16.

As best illustrated in FIGS. 3-7, the resin injection tooling 24 of embodiments of the present invention includes: a draw bar 26 operable to be positioned within a keyway 28 formed through a least a portion of a top surface of the lower die plate 12, with the keyway 28 generally separating the top surface of the lower die plate 12 into a front portion 30 and a back portion 32 (see FIG. 5), a base plate 34 secured to a back side of the draw bar 26 and operable to be secured to the back portion 32 of the surface of the lower die plate 12, and a manifold 36 secured to a top of the base plate 34. In operation, the manifold 36 is configured to receive hot resin from a resin source (not shown) and to discharge resin into the cavities 25 to form the parisons. The components of the resin injection tooling 24 may be formed from various types of material having high strength and durability. For example, such components may be formed from high-grade steel, such as a high-grade stainless steel.

Figure 3:
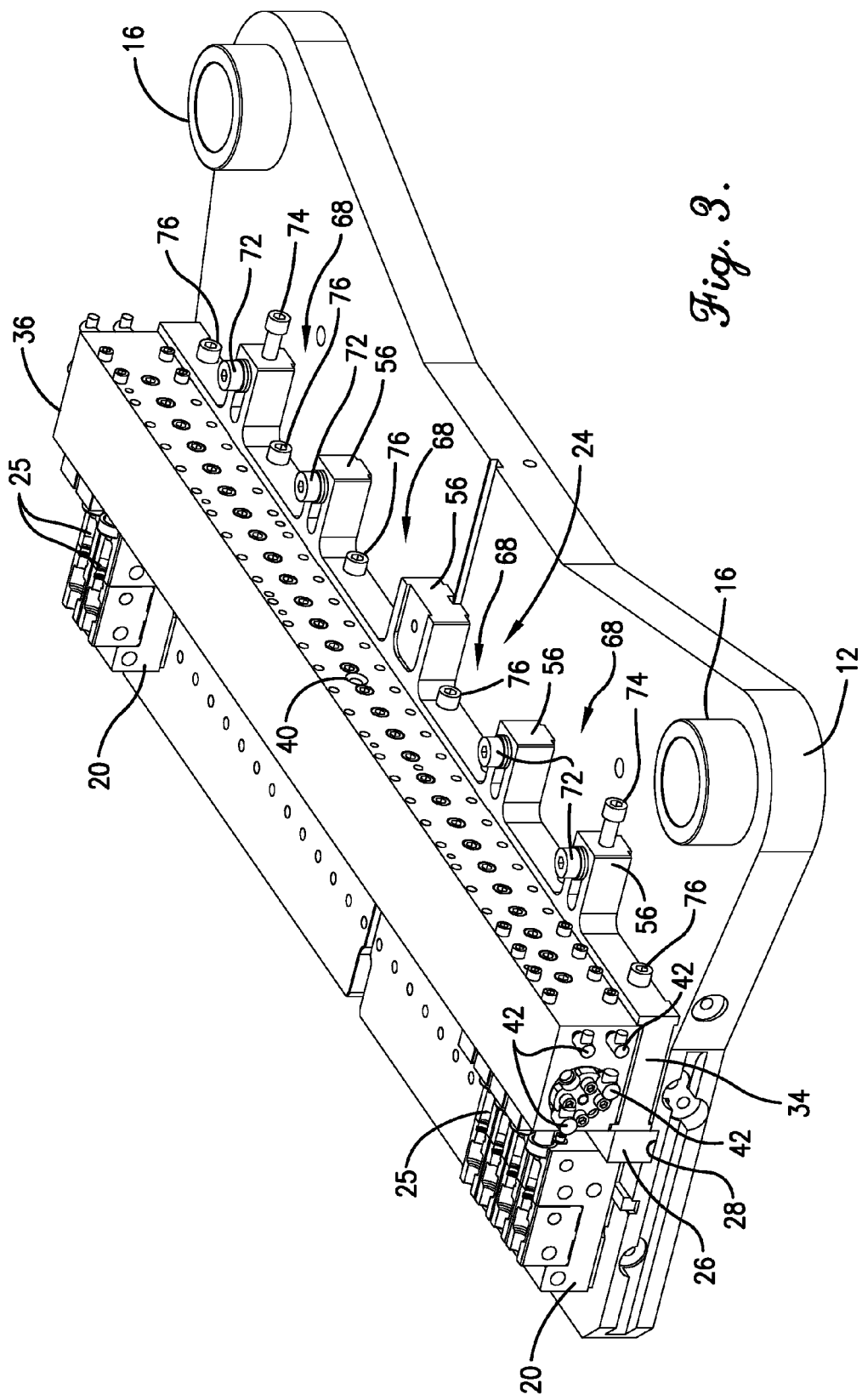
FIG. 3 is a back left partial perspective view of the injection station from FIGS. 1-2.
Figure 4:
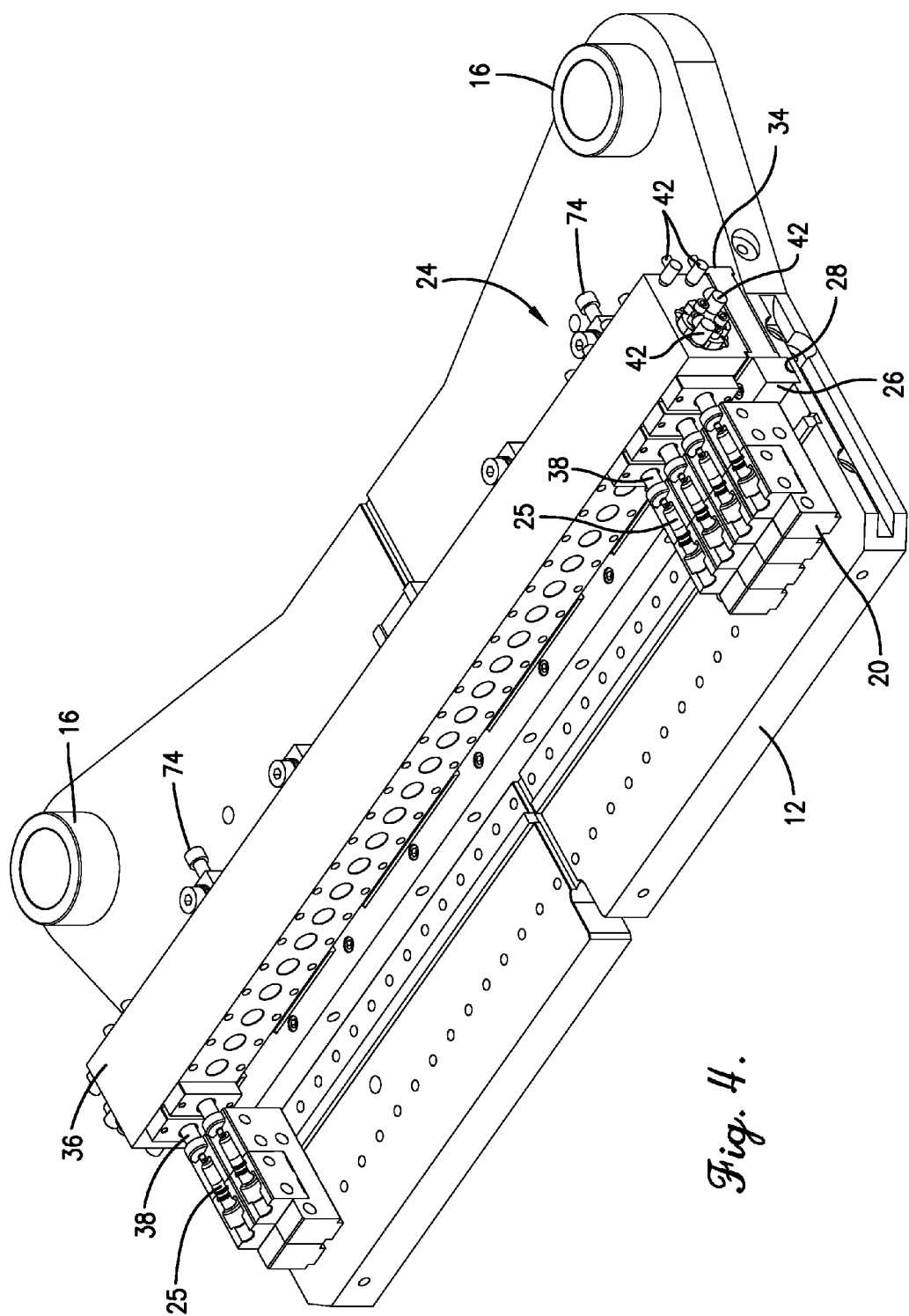
FIG. 4 is a front left partial perspective view of the injection station from FIGS. 1-2.
Figure 6:
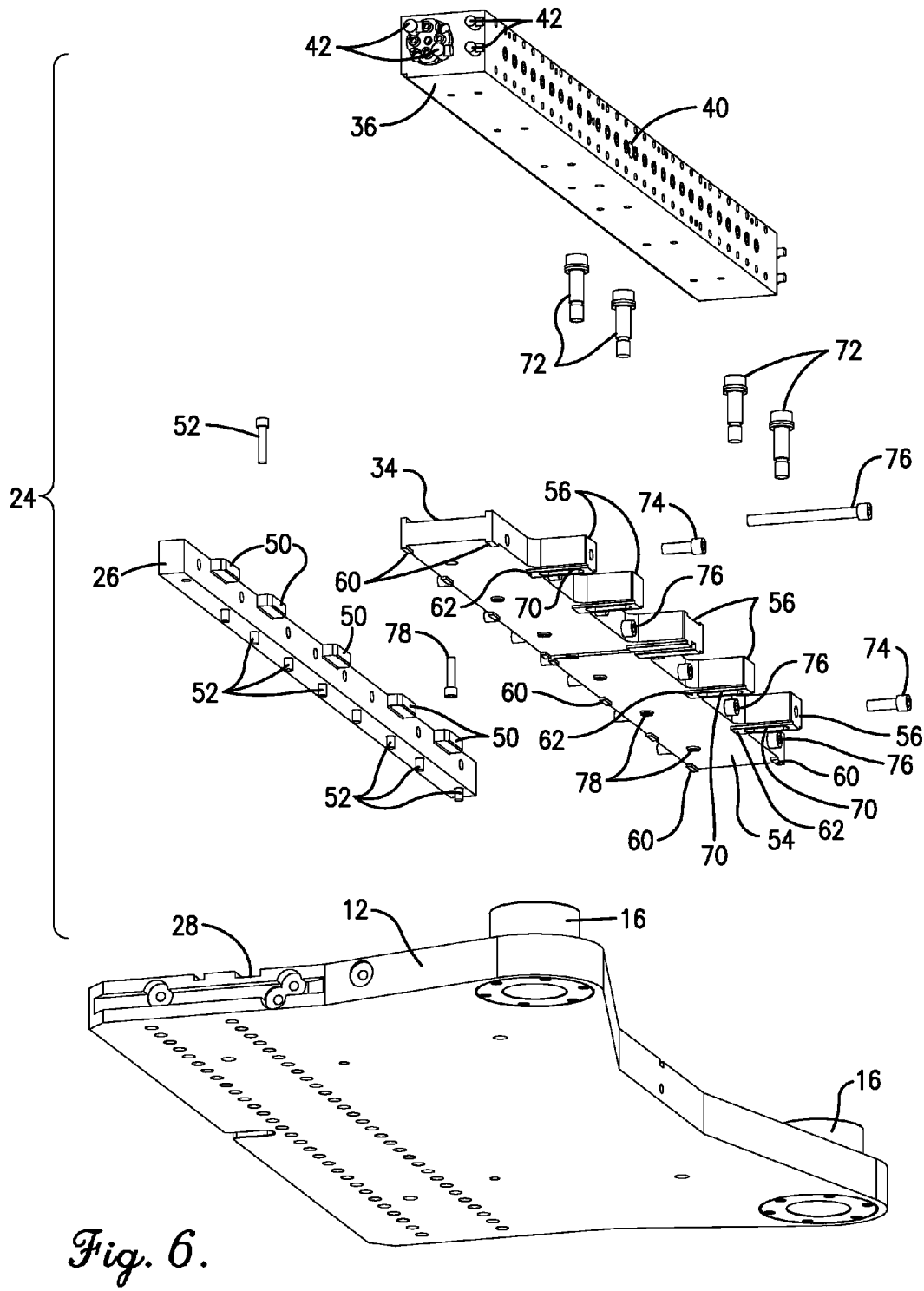
FIG. 6 is a bottom exploded partial view of the injection station from FIGS. 1-2.
Figure 7:
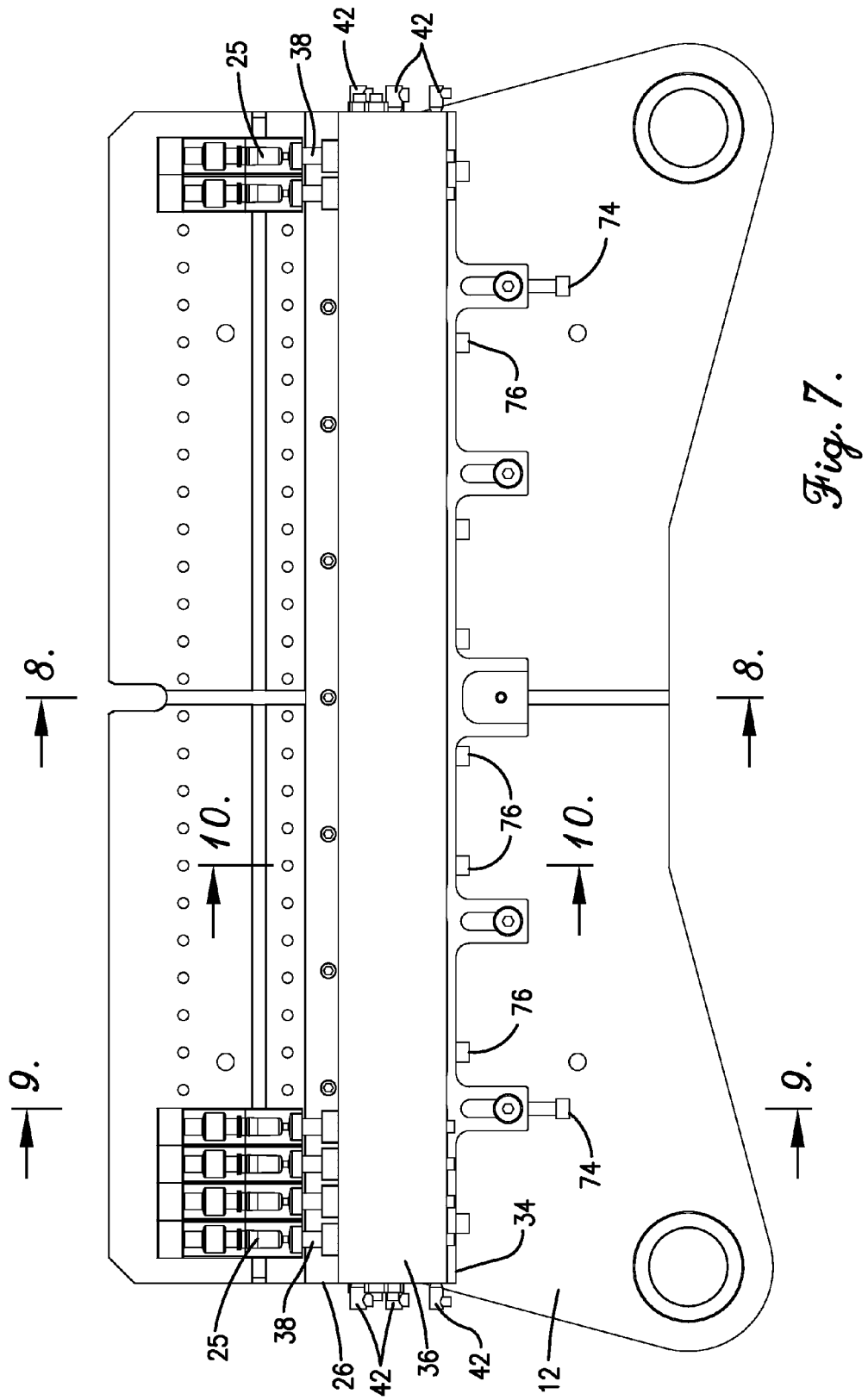
FIG. 7 is a plan view of the injection station from FIGS. 3-4.

Beginning with the manifold 36, as best illustrated in FIGS. 4 and 7, the manifold 36 is generally elongated and includes a series of injection nozzles 38 positioned on its front side. The manifold 36 receives hot resin from via an inlet sprue 40 (see FIGS. 4 and 6), with such resin being directed through internal passages in the manifold 36 to each of the injection nozzles 38. As such, the manifold 36 is operable to inject hot resin under pressure into the cavities 25 to form the parisons. As previously mentioned, during use of injection tooling that includes a zero gap between the nozzle and the gate insert, e.g., the tooling described in the '189 patent, the pressure generated during the injection of the resin from the nozzles can be significant. Especially in embodiments in which the manifold includes a plurality of nozzles, such pressure can be, for instance, several thousand to tens of thousands of pounds per square inch. Also as previously mentioned, the resin must be maintained at a sufficiently high temperature during injection. Such temperatures may be maintained through various heating devices associated with the injection station 10, such as may include hot water conduits, electrical heaters, or the like. For example, as illustrate in FIGS. 2-6, the manifold 36 may include a plurality of heating elements 42, in the form of electrical heating cartridges that extend through a length of the manifold 36.

Because of the high pressures and high temperatures involved during injection of the resin into the molds 18, certain components of the resin injection tooling 24 will tend to deform or will otherwise be forced out of alignment, which can interfere with the injection of the resin and creation of the parisons. Specifically, manifold 36 that includes a plurality of injection nozzles 38 will tend to bow backwards, especially near either or both of the manifold's 36 ends. The bowing of the manifold 36 is generally due to a hydraulic backpressure that results from the pressure of the resin as it is injected through the nozzles 38 and into the parison cavities 25. Such bowing not only affects the manifold 36, but may also affect the base plate 34, which supports the manifold 36 on the die plate 12 of the injection station 10. In addition to bowing, the hydraulic backpressure may also force the manifold 36 and the base plate 34 upward, away from the die plate 12. Furthermore, because of the high temperatures, various components of the resin injection tooling 24 may be prone to deform, with such deformation being due to thermal expansion/contraction caused by temperature differences experienced by the components. As a result of such misalignments and deformations, the injection of resin into the molds 18 to form parisons may be inhibited or prevented entirely.

Figure 5:
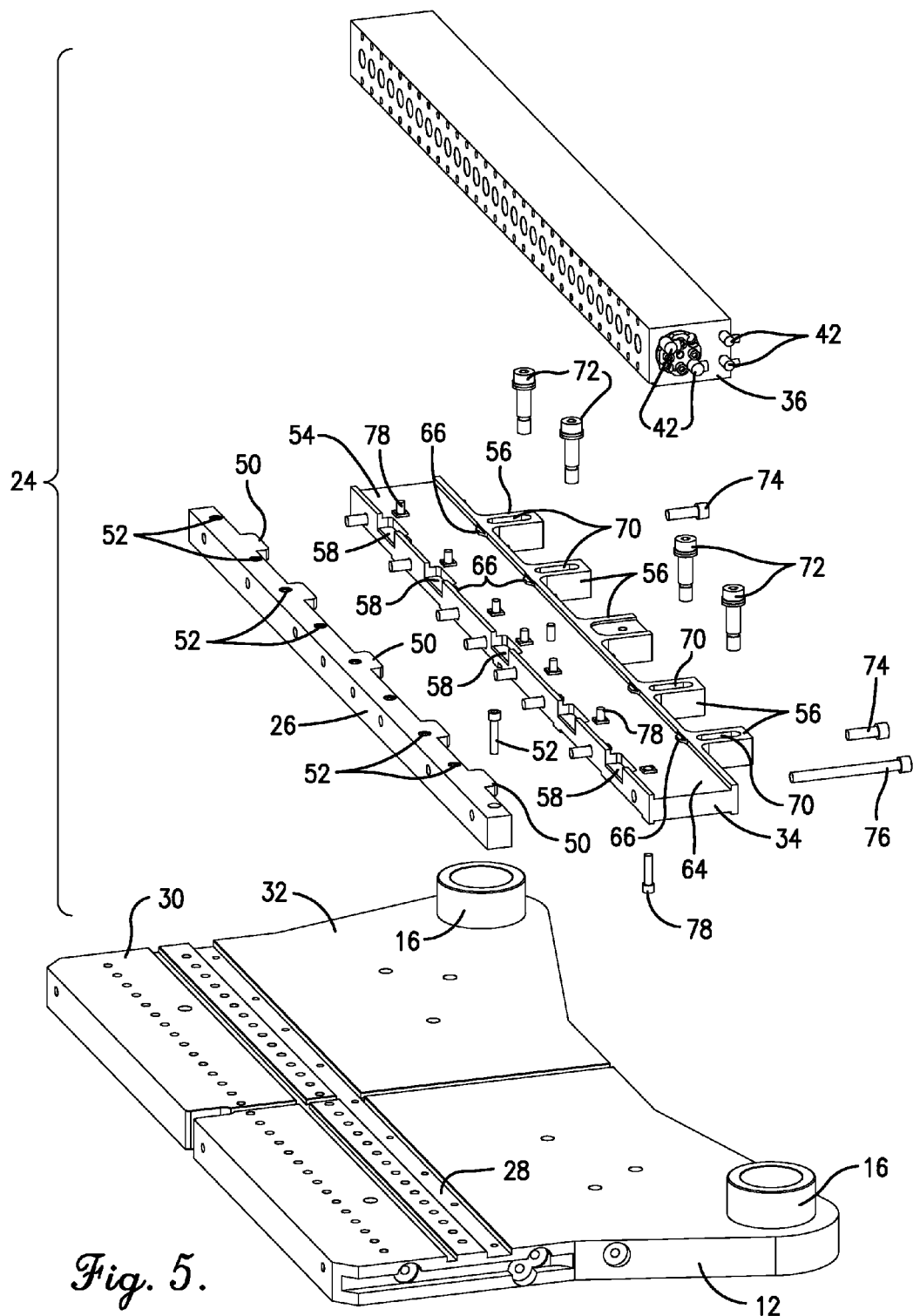
FIG. 5 is an top exploded partial view of the injection station from FIGS. 1-2.

To overcome such problems, the components of the injection station 10 and/or the resin injection tooling 24 include a plurality of features that help to ensure consistent alignment throughout operation. In particular, as illustrated in FIGS. 3-7, the die plate 12 of the injection station 10 will include the keyway 28 formed through its top surface, with the keyway 28 sized so as to receive the draw bar 26 of the resin injection tooling 24. The draw bar 26 may be formed from an elongated generally rectangular piece of material. As best shown in FIGS. 5-6, the draw bar 26 may include a plurality of tabs 50 extending rearward from a top portion of the draw bar 26.

Figure 8:
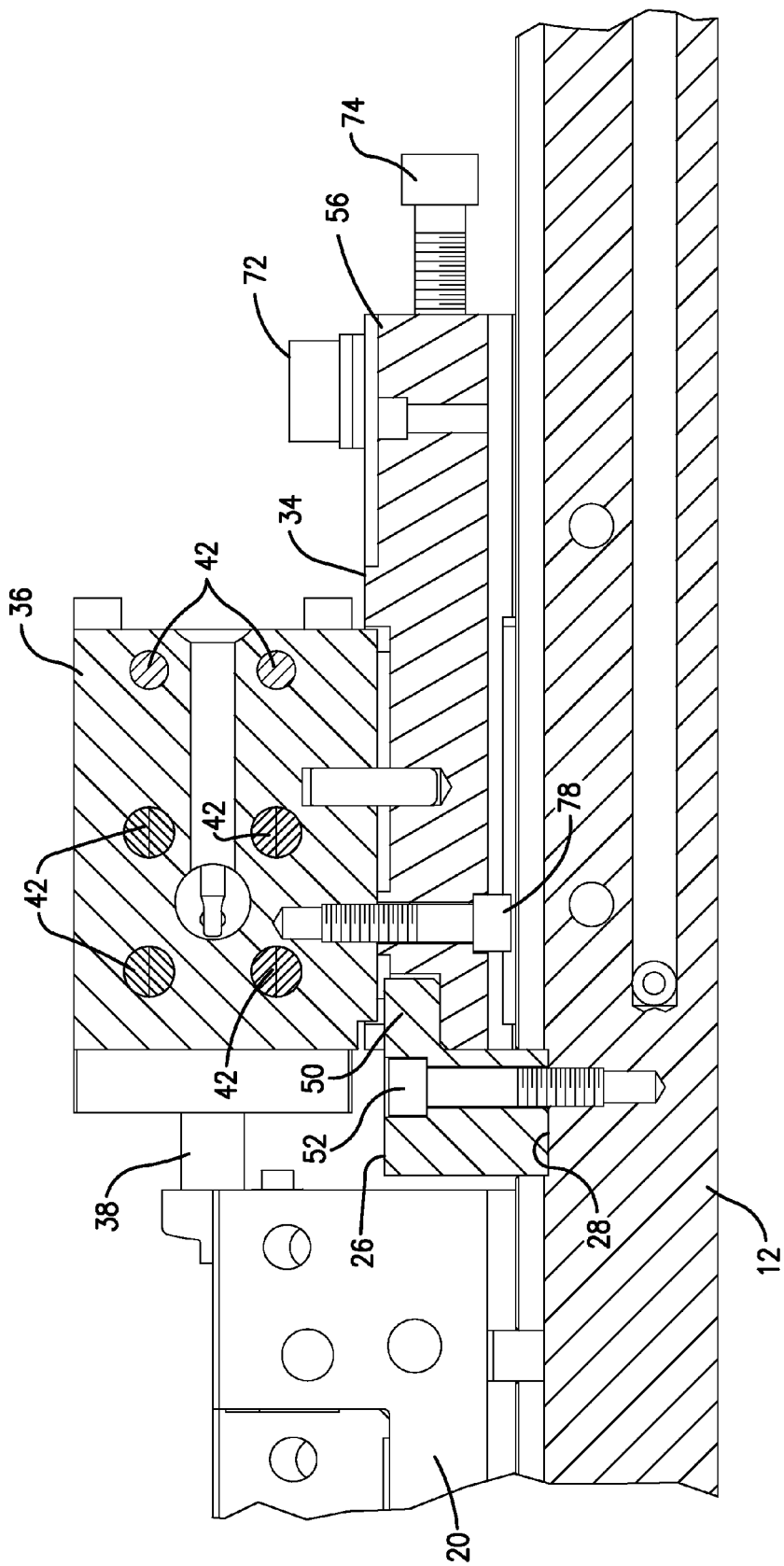
FIG. 8 is a cross-section view of the injection station from FIG. 7 taken along the line 8-8.

With the draw bar 26 received within the keyway 28, the draw bar 26 is restricted from translating forward or rearward about the top surface of the die plate 12. The draw bar 26 may be secured in place within the keyway 28 via a plurality of vertically-positioned threaded fasteners, such as draw bar bolts 52, which extend through a plurality of corresponding vertical apertures extending through the draw bar 26 and through aligned threaded apertures formed in the keyway 28 of the die plate 12. As such, with the draw bar 26 secured within the keyway 28 via the draw bar bolts 52 (e.g., as illustrated in FIGS. 3-4 and 8), the draw bar 26 is restricted from translating forward or rearward about the surface of the die plate 12 and is further restricted from moving vertically away from the die plate 12.

Returning to FIGS. 3-4, the base plate 34 is operable to be positioned on the top surface of the die plate 12, and specifically on the die plate's 12 back portion 32, just rearward of the draw bar 26. The base plate 34 is elongated with a length that generally corresponds with the draw bar 26. With reference to FIGS. 5-6, the base plate 34 includes a main section 54 and one or more projections 56 extending rearward from the main section 54. As best illustrated by FIG. 5, a front side of the main section 54 includes one or more notches 58 formed within a top portion of the base plate 34. As will be discussed in more detail below, the notches 58 of the base plate 34 will correspond with the tabs 50 of the draw bar 26, such that the tabs 50 can be received within the notches 58 for engaging the base plate 34 with the draw bar 26.

Figure 9:
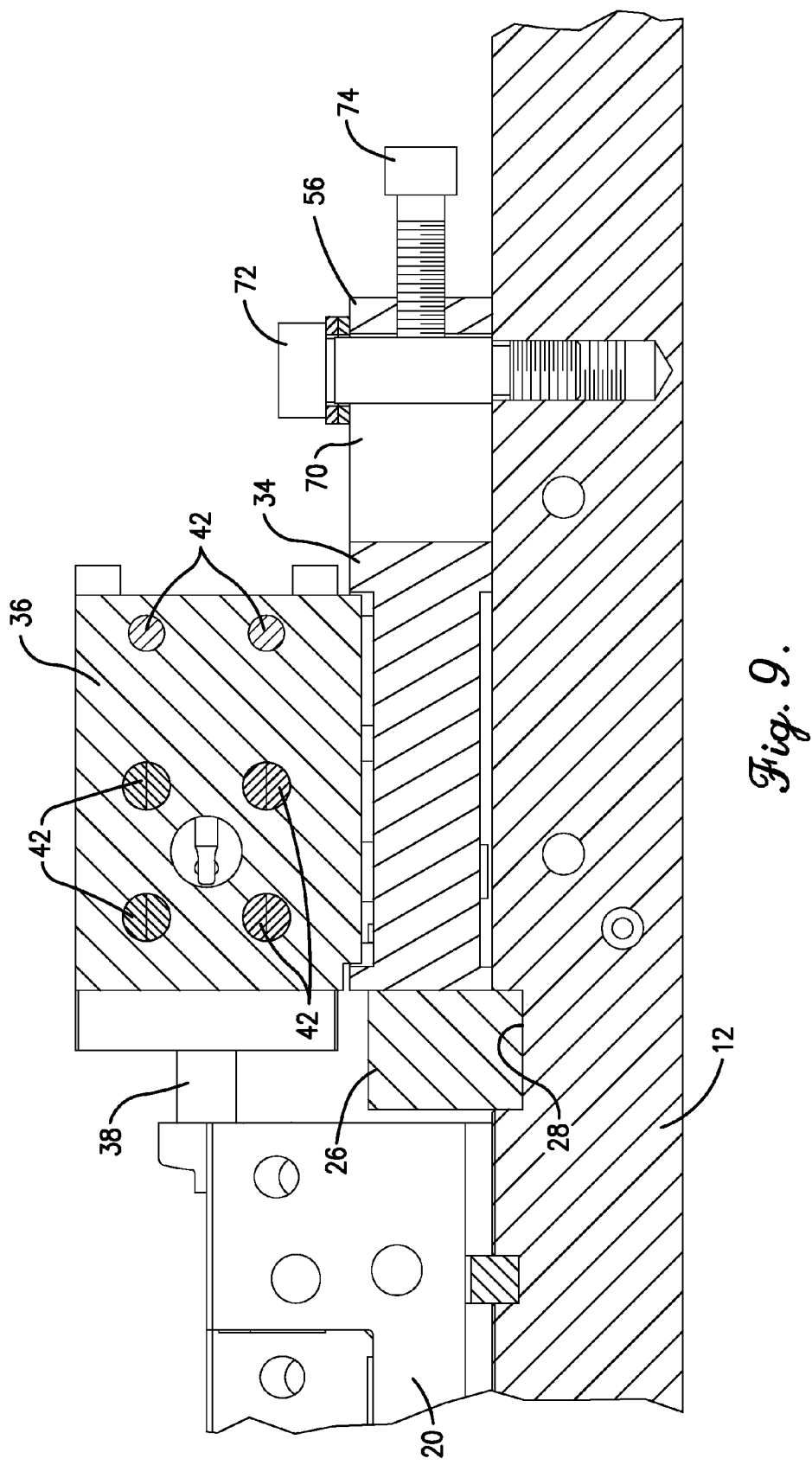
FIG. 9 is a cross-section view of the injection station from FIG. 7 taken along the line 9-9.
Figure 10:
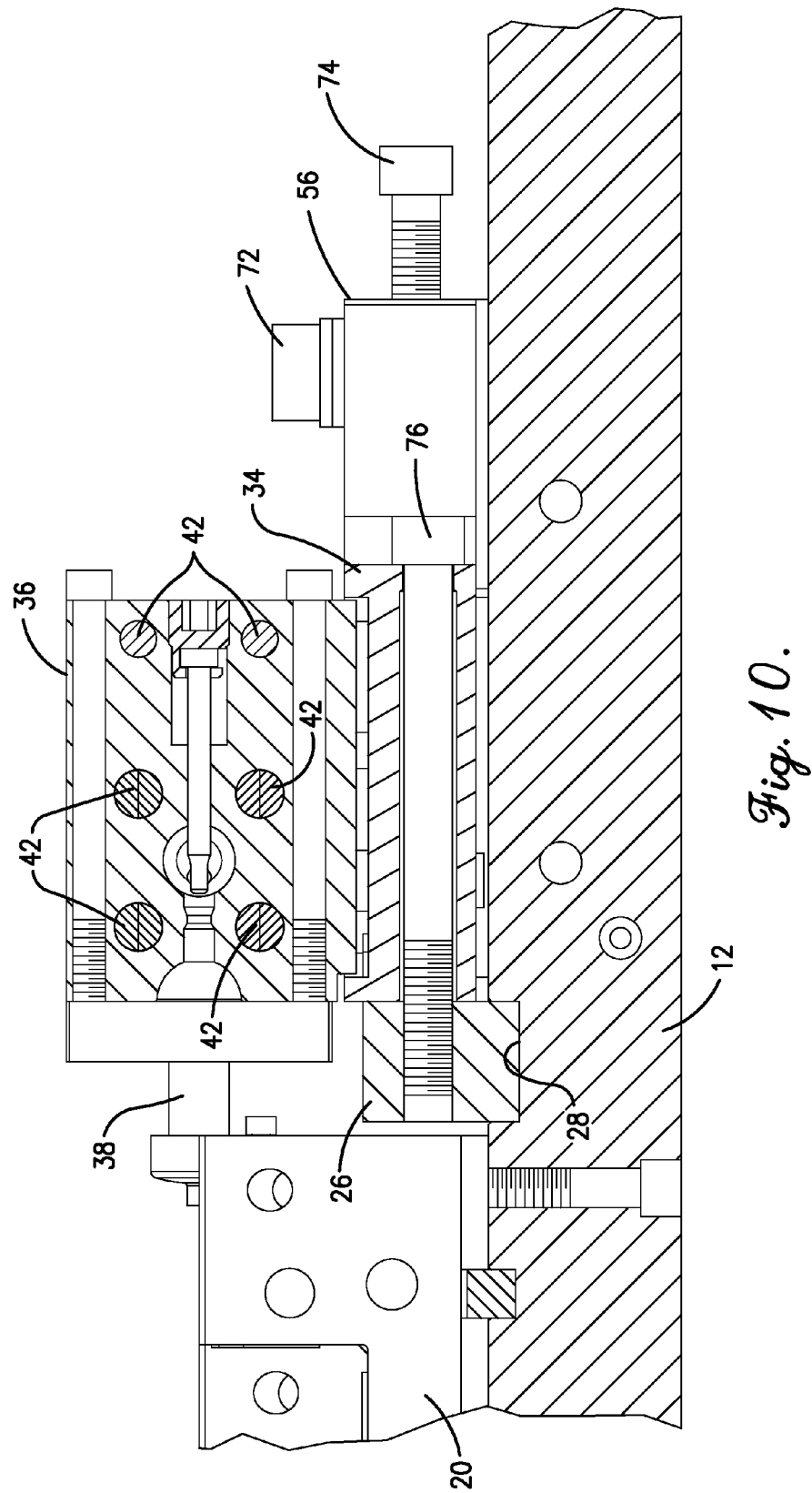
FIG. 10 is a cross-section view of the injection station from FIG. 7 taken along the line 10-10.

As best illustrated by FIG. 6, the main section 54 of the base plate 34 may include one or more legs 60 extending from a bottom portion of the base plate 34, and the projections 56 may include one or more risers 62 extending from a bottom portion of the projections 56, such that the base plate 34 is operable to contact the die plate 12 via said legs and risers 60, 62 so as to present a gap (see, e.g., FIGS. 3-4 and 9) between at least a portion of the die plate 12 and at least a portion of the base plate 34. Additionally, as best illustrated by FIG. 5, a top portion of the base plate 34 includes a recess 64 formed along the length of the base plate 34. As will be discussed in more detail below, the manifold 36 may be received within the recess 64 when the manifold 36 is secured to the base plate 34. In some embodiments, such as illustrated in FIG. 5, the recess 64 of the base plate 34 will include one or more pedestals 66 within the recess 64. When the manifold 36 is received within the recess 64, the manifold 36 may rest on the pedestals 66 such that a gap (see, e.g., FIGS. 3-4 and 8-9) is presented between at least a portion of the base plate 34 and a portion of the manifold 36.

As mentioned, the base plate 34 includes a plurality of projections 56 extending rearward from the base plate's 34 main section 54. As best illustrated by FIG. 3, the projections 56 may be spaced apart along a length of the base plate 34, such that voids 68 are presented between each of the adjacent projections 56. In some embodiments, such as illustrated in FIGS. 5-6, one or more of the projections 56 will include an elongated aperture 70 extending generally vertically from a top side of the projection 56 through to a bottom side of the projection 56. As such, a threaded fastener, such as in the form of a shoulder bolt 72, is operable to be inserted through the elongated aperture 70 and into an aligned threaded aperture formed in the die plate 12 so as to secure the base plate 34 to the back portion of the die plate 12 (see, e.g., FIG. 9). In some embodiments, the shoulder bolt 72 may also be associated with one or more washers for facilitating the securement of the base plate 34 to the die plate 12. As will be described in more detail below, although the shoulder bolt 72 is operable to secure the base plate 34 to the die plate 12, a clearance may exist between a head of the shoulder bolt 72 and a top surface of the projection 56. Such a clearance may provide for the projection 56 and/or the base plate 34 to expand or shift about the surface of the die plate 12, with such expansion/shifting being due to thermal effects. In some embodiments, such clearance may be between 0.000 and 0.004 inches, between 0.001 and 0.003 inches, or 0.002 inches. In additional embodiments, one or more of the projections 56 will include a threaded aperture extending generally horizontally from a back side of the projection 56 to the projection's 56 elongated aperture 70. As such and as illustrated in FIGS. 3, 5-6, and 9, a threaded fastener, such as in the form of a jack bolt 74, is operable to extend through the horizontally-extending threaded aperture so as to contact the shoulder bolt 72 that extends through the elongated aperture 70.

As illustrated in FIGS. 3-4, the base plate 34 is operable to be secured to the draw bar 26. As previously described, with the draw bar 26 secured to the die plate 12 within the keyway 28, the base plate 34 can be positioned with its front side adjacent to the back side of the draw bar 26. As such, the tabs 50 of the draw bar 26 will be received within the notches 58 of the base plate 34, thereby coupling the draw bar 26 and the base plate 34 together. As illustrated in FIGS. 3, 5-6, and 10, the base plate 34 can be further secured to the draw bar 26 via one or more threaded fasteners, in the form of drawbolts 76, which extend generally horizontally through horizontal apertures formed through the main section 54 of the base plate 34. The drawbolts 76 are operable to engage with generally horizontal threaded apertures formed through the back side of the draw bar 26 and through at least a portion of the draw bar's 26 thickness.

Finally, as mentioned above, embodiments provide for the manifold 36 to be secured to the top portion of the base plate 34 by having the manifold 36 be received within the recess 64 of the base plate 34. In particular, a bottom portion of the manifold 36 may rest on the pedestals 66 within the recess 64 of the base plate 34. In some embodiments, such as best illustrated in FIGS. 3-4 and 8, the bottom portion of the manifold 36 will have a smaller cross-section than a remaining portion of the manifold 36, such that the bottom portion of the manifold fits within the recess 64 while other portions of the manifold 36 overhang the base plate 34. Nevertheless, with the manifold 36 resting on the pedestals 66, the bottom portion of the manifold 36 is bound by the recess 64 of the base plate 34, such that the manifold 36 is incapable of translating forward or rearward beyond the recess 64. In some embodiments, such as illustrated in FIGS. 5-6 and 8, the manifold 36 will be secured to the base plate 34 via one or more threaded fasteners, in the form of manifold bolts 78, which extend generally vertically through vertical apertures formed through the main section 54 of the base plate 34. The manifold bolts 78 are operable to engage with vertical threaded apertures formed through a bottom side of the manifold 36 and through at least a portion of the manifold's 36 height.

In operation, the components of the injection station 10 and/or the resin injection tooling 24 provide for parison to be formed in a precise manner without such components bowing, lifting, or otherwise becoming misaligned. In particular, the draw bar 26 can be secured to the die plate 12 by first positioning the draw bar 26 within the keyway 28 of the die plate 12. Thereafter, the draw bar 26 can be secured to the die plate 12 via the draw bar bolts 52. With the draw bar 26 positioned within the keyway 28, the draw bar 26 is restricted from translating forward or rearward about the top surface of the die plate 12. Additionally, the draw bar bolts 52 restrict the draw bar 26 from moving vertically away from the die plate. 12.

Next, the base plate 34 is positioned on the die plate 12, as previously described, with the front side of the base plate 34 contacting the back side of the draw bar 26. As such, the tabs 50 of the draw bar 26 will be received within the notches 58 of the base plate 34. The base plate 34 is further drawn to and secured to the draw bar 26 via the drawbolts 76 extending through the base plate 34 and the draw bar 26. Further, the base plate 34 is secured to the die plate 12 via the shoulder bolts 72 extending through the elongated apertures 70 of the projections 56 and into the die plate 12. Thus, the base plate 34 is restricted from translating forward or rearward by its engagement with the draw bar 26, with such engagement enhanced via the drawbolts 76. Additionally, the base plate 34 is restricted from translating vertically away from the die plate 34 on a front side via the tabs 50 engaged with the notches 58 and on a rear side via the shoulder bolts 72.

Finally, the manifold 36 can be attached to the base plate 34 as previously described, by positioning at least a portion of the manifold 36 within the recess 64 at the top portion of the base plate 34. Additionally, the manifold 36 is secured to the base plate 34 via the manifold bolts 78 extending through the base plate 34 and into the manifold 36. As such, the recess 64 of the base plate 34 restricts the manifold from translating forward or rearward, while the manifold bolts 78 restrict the base plate 34 from translating vertically away from the base plate 34.

Generally, the draw bar 26, the base plate 34, and the manifold 36 of the resin injection tooling 24 will be assembled, as described above, before the injection station 10 is operational. As previously noted, the operational temperatures of the components of the injection station 10 and/or the resin injection tooling 24 can be quite high (e.g., between 350 to 560° F.). However, before the injection station 10 becomes operational, the temperature of the components of the injection station 10 and/or the resin injection tooling 24 may not be as high. For example, a pre-operational temperature of the components of the injection station 10 and/or the resin injection tooling 24 may be a general room temperature (e.g., 60 to 90° F.). Given such potential temperature changes undergone by the components of the injection station 10 and/or the resin injection tooling 24 between pre-operational and operational stages, the materials of which certain components of the resin injection tooling 24 are formed, such as the manifold 36 and the base plate 34, may expand or contract due to thermal effects. Such thermal effects may unwantedly enhance bowing of the components or otherwise may force the components out of alignment.

Nevertheless, embodiments of the present invention provide for the reduction or termination of any bowing of the components of the resin injection tooling 24. Embodiments may, thus, provide for the components of the resin injection tooling 24 to maintain appropriate alignment throughout operation. For example, even if the base plate 34 expands during the transition of the injection station 10 from the pre-operational to the operational stages, the elongated apertures 70 allow the base plate 34, including the projections 56, to expand rearward about the shoulder bolts 72. In more detail, and as previously mentioned, the head of the shoulder bolts 72 may include a clearance (e.g., 0.002 inches) with respect to the top surface of the projections 56. As such, should the base plate 34 expand while the injection station 10 is becoming operational, or even during operation, the base plate 34 and its projections 56 are able to expand around the shoulder bolts 72. It should be noted, that even though the clearance between the head of the shoulder bolts 72 and the projections 56 allows the base plate 34 to expand, the shoulder bolts 76 secure the base plate 34 to the die plate 12, such that the base plate 34 is restricted from translating vertically away from the die plate 12.

Furthermore, it is understood that the projections 56 of the base plate 34 are formed so as to minimize any potential amounts of thermal expansion of the base plate 34. Specifically, because the projections 56 are spaced apart and separated by voids 68, a total volume of material made up by the projections 56 is small compared to a volume of the main section 54 of the base plate 34. As such, a temperature gradient of the base plate 34 is similarly small from a front side of the base plate 34 to the back side of the base plate 34. Such a small temperature gradient provides for symmetrical heating and reduces any amount of thermal expansion experienced by the base plate 34.

Once the injection station 10 and/or the resin injection tooling 24 reaches operational temperatures and the manifold 36 begins injecting resin into the molds 18, the hydraulic backpressure caused by such injections tends to force the manifold 36 rearward. Such a hydraulic backpressure is especially significant at the ends of the manifold 36, which can cause the manifold 36 to bow rearward. Such bowing can be further enhanced by the thermal expansion seen by various components of the injection station 10 and/or the resin injection tooling 24, as previously described. Embodiments of the present invention alleviate and/or prevent such bowing via the draw bar 26. In particular, as previously described and as may best be seen in FIG. 9, the draw bar 26 is restricted from translating forward or rearward by its placement within the keyway 28. Similarly, the base plate 34 is restricted from translating forward or rearward because it is secured to the draw bar 26 via the drawbolts 76 (see, e.g., FIG. 10). In particular, the drawbolts 76 positioned adjacent to ends of the base plate 34 prevent bowing by alleviating rearward movement of the base plate 34 at the base plate's 34 ends. As such, with the draw bar 26 and the base plate 34 restricted from forward or rearward translation, the manifold 36 is likewise restricted from such forward or rearward translation, including bowing at its ends. Furthermore, the heating elements 42 may prevent the manifold 36 from bowing by reducing a temperature gradient within the manifold. In particular, a front portion of the manifold 36 may generally have a high temperature during operation, with such higher temperature being due to the presence of the nozzles 38 that inject heated resin into the molds 18. The heating elements 42, and particularly the heating elements 42 positioned through a back portion of the manifold 36, may provide additional heat to the back portion of the manifold 36. As such, the heating elements 42 will function to create a consistent temperature throughout the manifold 36, so as to reduce any temperature gradient experienced by the manifold 36. By reducing the temperature gradient experienced by the manifold 36, any manifold 36 bowing that may be caused by temperature effects can be correspondingly be reduced.

Thus, embodiments of the present invention provide for reduction and/or prevention of deformations and misalignments of the resin injection tooling 24, with such deformation and misalignments being potentially due to hydraulic backpressure and/or heat deformations.

Finally, in addition to facilitating assembly of the components of the injection station 10 and/or the resin injection tooling 24, embodiments of the present invention may facilitate the disassembly of certain components of the injection station 10 and/or the resin injection tooling 24. In particular, once the base plate 34 is secured to the draw bar 26, it can be difficult to remove the base plate 34. Such removal may be required for maintenance of the injection station 10. Embodiments of the present invention facilitate such disassembly via the jack bolts 74, which are inserted through the back sides of one or more of the projections 56. To begin disassembly, the drawbolts 76 can be removed from the draw bar 26. As such, the base plate 34 is no longer secured to the draw bar 26. Next, the shoulder bolts 72 can be loosened from the die plate 12. It should be noted that the shoulder bolts 72 should only be loosened such that the base plate 34 can translate forward or rearward about the die plate 12, but that the shoulder bolts 72 should still be engaged with the die plate 12. As such, the jack bolts 74 can be actuated such that they are forced against the shoulder bolts 72. Such an actuation is operable to force the base plate 34 rearward away from the draw bar 26. Once the base plate 34 has been sufficiently displaced from the draw bar 26, the shoulder bolts 72 may be completely removed, and the base plate 34 may be removed from the die plate 12.

Although the invention has been described with reference to the preferred embodiment illustrated in the attached drawing figures, it is noted that equivalents may be employed and substitutions made herein without departing from the scope of the invention as recited in the claims.

What is claimed is:

1. An injection station of an injection blow molding machine, said injection station being configured for injecting a resin into mold cavities to form parisons, said injection station comprising:
    a die plate with a keyway formed through a least a portion of a surface of said die plate, wherein said keyway separates front and back portions of the surface of said die plate;
    a draw bar, with at least a portion of said draw bar positioned within said keyway of said die plate;
    a base plate secured to the back portion of the surface of said die plate and to a back side of said draw bar; and
    a manifold secured to a top of said base plate, wherein the manifold is configured to discharge resin into the cavities to form the parisons.

2. The station of claim 1, wherein said keyway is operable to restrict said draw bar from translating frontward or rearward about the surface of said die plate.

3. The station of claim 1, wherein said draw bar includes at least one tab extending from a back side of said draw bar, and wherein said base plate includes at least one notch formed through a portion of a front side of said base plate adjacent to the top of said base plate.

4. The station of claim 3, wherein said at least one tab is configured to be received in said at least one notch, and wherein said tab is operable prevent a front portion of said base plate from shifting away from the surface of said die plate.

5. The station of claim 1, wherein said draw bar is secured to said die plate via at least one fastener extending through aligned apertures formed through said draw bar and through said die plate.

6. The station of claim 1, wherein said base plate includes a main section and is formed with a plurality of projections extending from the main section of said base plate.

7. The station of claim 6, wherein at least one of said projections includes an elongated aperture extending from a top side of said projection through a bottom side of said projection, and wherein a first fastener is operable to extend through said elongated aperture to secure said base plate to the back portion of the surface of said die plate.

8. The station of claim 7, wherein at least one of said projections includes a horizontal aperture extending from a back side of said projection to said elongated aperture, and wherein a second fastener is operable to extend through said horizontal aperture to contact said first fastener.

9. The station of claim 6, wherein said base plate includes one or more legs extending from a bottom portion of said base plate, and wherein said projections include one or more risers extending from a bottom portion of said projections, such that said base plate contacts said die plate via said legs and said risers so as to present a gap between at least a portion of said die plate and at least a portion of said base plate.

10. The station of claim 1, wherein a portion of the top of said base plate includes a recess, and wherein said manifold is received within said recess when secured to said base plate.

11. The station of claim 10, wherein said recess of said base plate includes one or more pedestals within said recess, and wherein when said manifold is received within said recess, said manifold rests on said pedestals such that a gap is presented between at least a portion of said base plate and a portion of said manifold.

12. The station of claim 1, wherein said base plate is secured to the back side of said draw bar via at least one drawbolt extending through at least one aperture formed through said base plate, wherein said at least one aperture extends from a back side of said base plate to a front side of said base plate.

13. A resin injection tooling for attachment to at least one die plate associated with an injection blow molding machine, with said resin injection tooling being configured to inject a resin into mold cavities to form parisons, said resin injection tooling comprising:
    a base plate configured to be secured to a top surface of the die plate,
    wherein said base plate includes a main section and a plurality of projections extending rearward from said main section; and a manifold secured to a top of said base plate, wherein said manifold is configured to discharge resin into the cavities to form the parisons.

14. The tooling of claim 13, wherein at least one of said projections includes an elongated aperture extending from a top side of said projection through a bottom side of said projection, and wherein a first fastener is operable to extend through said elongated aperture to secure said base plate to the top surface of the die plate.

15. The tooling of claim 14, wherein at least one of said projections includes a horizontal aperture extending from a back side of said projection to said elongated aperture, and wherein a second fastener is operable to extend through said horizontal aperture to contact said first fastener.

16. The tooling of claim 13, wherein said base plate includes one or more legs extending from a bottom portion of said base plate, and wherein said projections include one or more risers extending from a bottom portion of said projections, such that said base plate is configured to contact the die plate via said legs and risers so as to present a gap between at least a portion of the die plate and at least a portion of said base plate.

17. The tooling of claim 13, wherein a portion of the top of said base plate includes a recess, and wherein said manifold is received within said recess when secured to said base plate.

18. The tooling of claim 17, wherein said recess of said base plate includes one or more pedestals within said recess, and wherein when said manifold is received within said recess, said manifold rests on said pedestals such that a gap is presented between at least a portion of said base plate and a portion of said manifold.

\* \* \* \* \*